United States Patent [19]

Sasajima et al.

[11] Patent Number: 5,001,900
[45] Date of Patent: Mar. 26, 1991

[54] METHOD OF CONTROLLING SPEED REDUCTION RATIO FOR CONTINUOUSLY VARIABLE SPEED TRANSMISSION

[75] Inventors: Koji Sasajima, Saitama; Hideo Koyama, Tokyo, both of Japan

[73] Assignee: Honda Giken Kogyo Kabushiki Kaisha, Tokyo, Japan

[21] Appl. No.: 260,187

[22] Filed: Oct. 19, 1988

[30] Foreign Application Priority Data

Oct. 19, 1987 [JP] Japan .................. 62-263057

[51] Int. Cl.$^5$ .......................... F16H 61/42
[52] U.S. Cl. ...................... 60/327; 60/487; 74/866; 364/424.1
[58] Field of Search .............. 60/327, 445, 448–449, 60/459, 468, 469, 487–489, 494; 180/307; 74/866; 364/424.1

[56] References Cited

U.S. PATENT DOCUMENTS

| | | | |
|---|---|---|---|
| 4,370,904 | 2/1983 | Muller et al. | 74/858 |
| 4,589,302 | 5/1986 | Oda et al. | 74/866 |
| 4,641,553 | 2/1987 | Kobayashi | 74/866 |
| 4,665,775 | 5/1987 | Nagamatsu et al. | 74/868 |
| 4,689,956 | 9/1987 | Hein | 60/445 X |
| 4,701,853 | 10/1987 | Osanai | 74/866 X |
| 4,750,598 | 6/1988 | Danno et al. | 192/0.058 |
| 4,753,133 | 6/1988 | Itoh et al. | 74/866 |
| 4,846,019 | 7/1989 | Kumura | 74/864 |

FOREIGN PATENT DOCUMENTS

| | | |
|---|---|---|
| 0093312 | 11/1983 | European Pat. Off. . |
| 0207231 | 1/1987 | European Pat. Off. . |
| 0240178 | 10/1987 | European Pat. Off. . |
| 3508155 | 9/1985 | Fed. Rep. of Germany ........ 60/449 |
| 95263 | 5/1985 | Japan . |
| 4640 | 1/1987 | Japan ................... 60/431 |
| 4643 | 1/1987 | Japan ................... 60/431 |
| 4646 | 1/1987 | Japan ................... 60/431 |
| 4641 | 10/1987 | Japan ................... 60/431 |

Primary Examiner—Edward K. Look
Assistant Examiner—George Kapsalas
Attorney, Agent, or Firm—Lyon & Lyon

[57] ABSTRACT

A method of controlling a speed reduction ratio in a continuously variable speed transmission comprises detecting a vehicle speed when a vehicle is decelerated by utilizing an engine brake with an accelerator opening being essentially zero, determining a reference speed reduction ratio corresponding to the detected vehicle speed, detecting an actual vehicle speed change rate, detecting an allowable vehicle speed change rate, comparing the actual change rate with said allowable vehicle speed change rate, determining a corrected speed reduction ratio by adding a correction to the reference speed reduction ratio based on a difference between the actual vehicle speed change rate and the allowable vehicle speed change rate, and controlling the speed reduction ratio of the continuously variable speed transmission so as to coincide with the corrected speed reduction ratio.

5 Claims, 3 Drawing Sheets

METHOD OF CONTROLLING SPEED REDUCTION RATIO FOR CONTINUOUSLY VARIABLE SPEED TRANSMISSION

BACKGROUND OF THE INVENTION

This invention relates to a method of controlling a speed reduction ratio in a continuously variable speed transmission, and more particularly to a method of controlling a speed reduction ratio while reducing vehicle speed with engine brake applied.

It is well known that the vehicle is generally decelerated utilizing engine brake by releasing the accelerator pedal to make accelerator opening (the depressed amount of the accelerator pedal or the engine throttle opening actuated by the accelerator pedal connected thereto) zero.

That is also the case with vehicles provided with a continuously variable speed transmission. However, since a continuously variable speed transmission can continuously control its speed reduction ratio, and a speed reduction ratio, if controlled, can control the magnitude of engine brake force as well, how to control a speed reduction ratio in vehicle deceleration has been of particular concern from the standpoint of driver comfort and so forth.

Such being the case, heretofore, for example, when reducing vehicle speed with engine brake applied, there have been utilized the methods of controlling speed reduction ratio: a speed reduction ratio is reduced automatically in accordance with the vehicle speed, or as disclosed in the Japanese Patent laid-open Publication No. 60(1985)-95263, the speed reduction ratio is so controlled that the engine brake force is varied based on the vehicle speed.

Such speed reduction ratio control methods as described above, however, do not take into account the running road condition and so forth. For this reason, when an engine brake is applied even at an identical vehicle speed to reduce vehicle speed, the effect of the engine brake may be different depending on the road condition, e.g., a flat road, an ascending road or a descending road, thus resulting in an uncomfortable feeling for the driver during decelerating running with the engine brake. In general it maybe said that the engine brake tends to be too strong for ascending, and too weak for descending.

SUMMARY OF THE INVENTION

It is an object of the present invention to provide a ratio control method that which can adjust the engine brake force based on road conditions and so forth.

To achieve the object described above, a ratio control method according to the invention comprises, detecting a vehicle speed when a vehicle is decelerated by utilizing the engine brake with an accelerator opening being zero, determining a reference speed reduction ratio corresponding to the detected vehicle speed based on a predefined reference speed reduction ratio table for various vehicle speeds, detecting an actual change rate of the vehicle speed, determining an allowable vehicle speed change rate corresponding to the vehicle speed, comparing the actual change rate with the allowable vehicle speed change rate, determining a corrected speed reduction ratio by adding a correction to the above reference speed reduction ratio based on the difference between the actual speed change rate and the allowable speed change rate, and controlling the speed reduction ratio of a continuously variable speed transmission so as to coincide with the corrected speed reduction ratio.

In a control method of speed reduction ratio according to the present invention, first a reference speed reduction ratio is determined from the predefined reference speed reduction ratio table for various vehicle speeds in decelerating the vehicle with the engine brake. The actual change rate of the vehicle speed (deceleration or acceleration) is also detected to compare the actual speed change rate for instance with the allowable vehicle speed change rate predefined based on a case running on flat roads. And then a corrected speed reduction ratio is determined by adding a correction to the above reference speed reduction ratio based on the difference between the both speed change rates. And finally the speed reduction ratio is so controlled that the current speed reduction ratio coincides with the corrected speed reduction ratio. Therefore, for example, when a vehicle speed is reduced greatly (the change rate of vehicle speed is great toward deceleration) as in deceleration on ascending road, such a speed control is selected that the speed reduction ratio is decreased to have small engine brake, thus obtaining the engine brake force desirable for the road condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
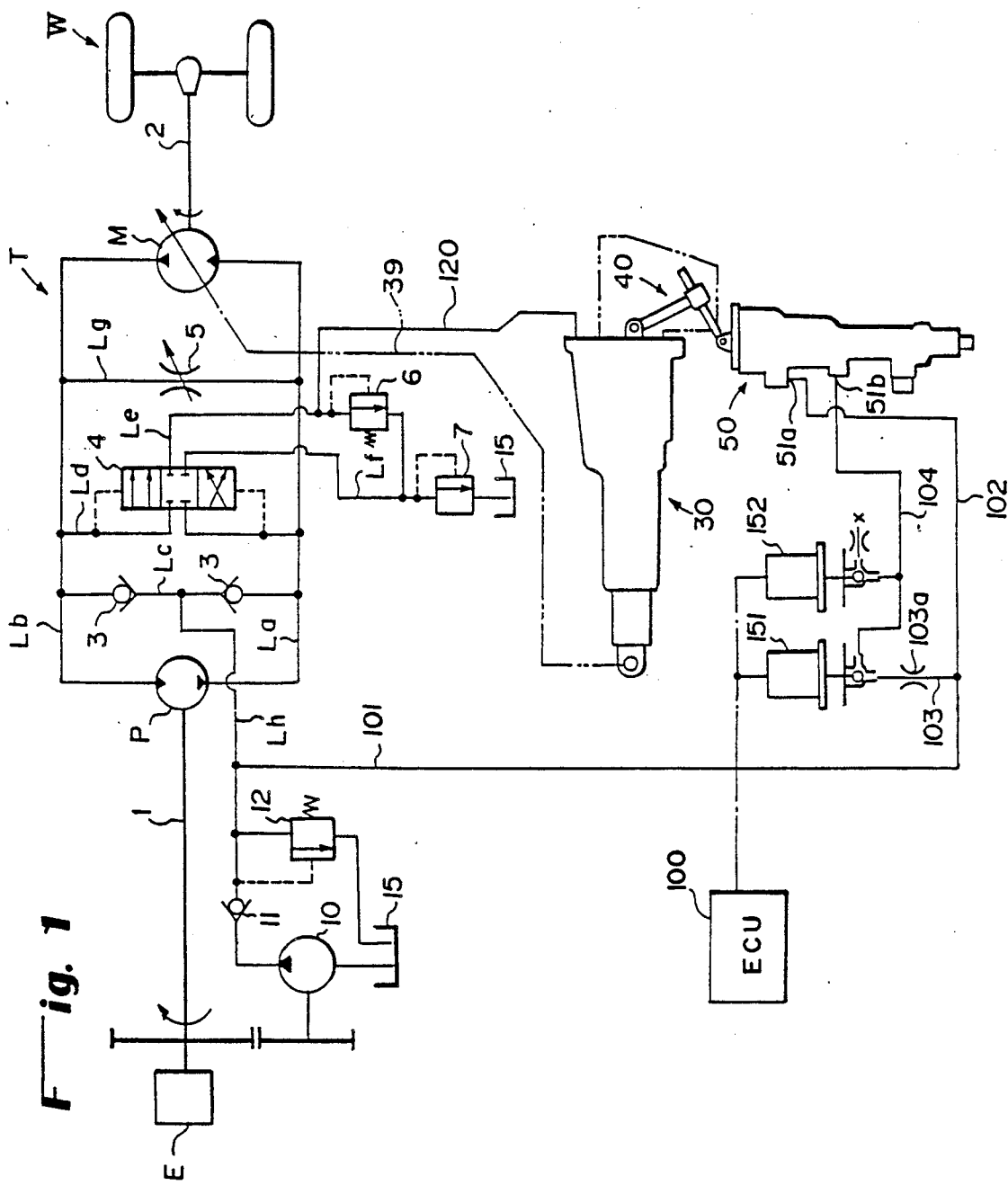
FIG. 1 is a hydraulic circuit diagram of a continuously variable speed transmission whose speed reduction ratio is controlled by a method according to the invention.

FIG. 1 shows a hydraulic circuit diagram of a continuously variable speed transmission whose speed reduction ratio is controlled by the method according to the present invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which has lower pressure through the check valves 3, 3. A fourth hydraulic line Ld having a shuttle valve 4 is connected to the closed circuit. To the shuttle valve 4 is connected a fifth and a sixth hydraulic line Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference of the first and second hydraulic lines La and Lb to shift to either of the extreme positions to connect either of the first or second hydraulic lines La, Lb having higher pressure to the fifth hydraulic line Le as well as to connect the other hydraulic line La or Lb having lower pressure to the sixth hydraulic line Lf. Therefore, the relief pressure of a higher pressure line is regulated by the high pressure relief valve 6, and the relief hydraulic pressure of the other lower pressure-side line is regulated by the low pressure relief valve 7. When the pressures in hydraulic lines La and Lb are equal, the valve 4 is in the central position for closing the line Ld.

Between the first and second hydraulic lines La and Lb is provided a seventh hydraulic line Lg to selectively short-circuit the two lines. The seventh hydraulic line Lg is provided with a clutch valve 5, which is a variable opening control valve to control the opening degree of the line. Therefore, the opening control of the clutch valve 5 can effect clutch control to control the transmission of driving force from the hydraulic pump P to the hydraulic motor M.

Actuators for displacement control of the hydraulic motor M to control the speed reduction ratio of the continuously variable speed transmission T are a first and a second ratio control servo unit 30, 50 which are connected with each other by means of a link mechanism 40. The hydraulic motor M is of a swash plate axial piston type, and its displacement is changed by the control of a swash plate angle by means of the ratio control servo units 30, 50.

The operation of the ratio control servo units 30, 50 is controlled by solenoid valves 151, 152 which are duty-ratio-controlled by signals from a controller 100. The controller 100 receives signals corresponding to a vehicle speed Y, an engine speed Ne, a throttle opening $\theta$th, an swash plate slant angle $\theta$tr of the hydraulic motor M, an accelerator pedal opening $\theta$acc operated by the driver, and an atmospheric pressure Pat. Based on these signals, the controller 100 outputs signals for controlling the above solenoid valves so as to effectuate desirable vehicle traveling controls.

Figure 2:
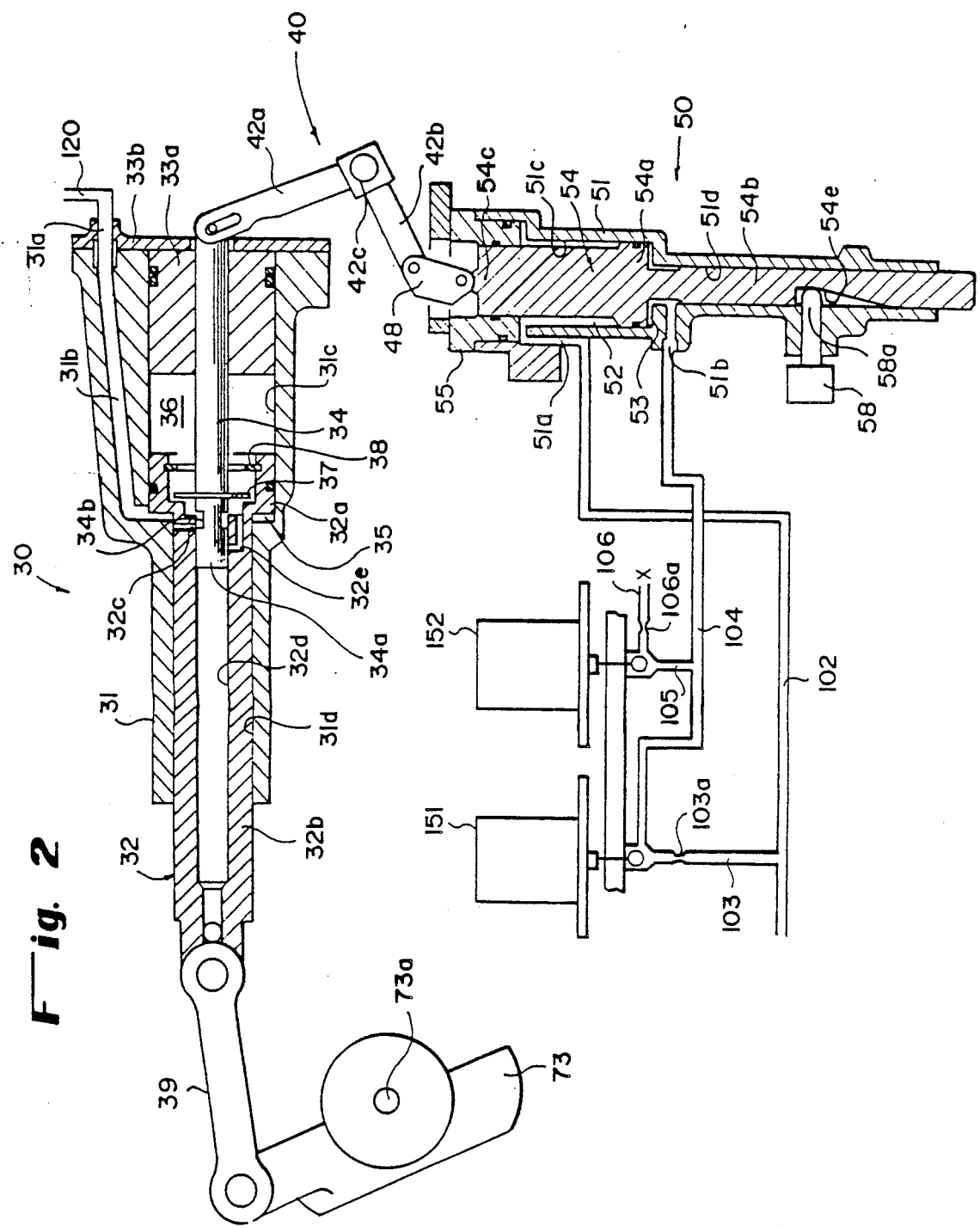
FIG. 2 is a sectional view of first and second speed control servo units.

The structures and operations of the above servo units 30, 50 are described in detail below based on FIGS. 1 and 2.

The first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and a cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 35 to the oil sump (not shown) through the spool hole 32d responding to the rightward motion of the spool member 34 and a connection passage 32c which can connect the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in ares where pressure is applied and therefore the piston member 32 is moved so as to follow the spool member 34.

When the spool member 34 is held still, the piston member 32 is also held still creating a hydraulically balanced state because of pressure balance between the left and right cylinder chambers 35, 36.

As discussed, when the spool member 34 is moved leftward or rightward, the piston member 32 is moved laterally so a to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b which hydraulic lines 102, 104 are connected respectively, and the spool member 54 vertically slidably fitted in the housing 51. The spool member 54 consists of a piston portion 54a, and end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 communicate with the upper and lower cylinder chambers 52, 53 through the ports 51a, 51b, respectively. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressure supplied through the hydraulic lines 102, 104 enables control of the motion of the spool member 34 and the piston member 32 in the firsts servo unit 30 and also enables control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the upper cylinder chamber 52 is sent through a hydraulic line 101 and 102 from the delivery line of the charge pump 10 after its pressure is regulated by the charge pressure relief valve 12. The oil pressure in the hydraulic line 104 connecting the port 51b with the lower cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the upper cylinder chamber 52 a charge pressure regulated by the charge pressure relief valve 12 is applied through the line 102, while to the lower cylinder chamber 53 is supplied from the line 104 a lower pressure than the charge pressure which is regulated by the first and second solenoid valves 151 and 152. In this connection, since the pressure applied area of the upper cylinder chamber 52 is smaller than that of the lower cylinder chamber 53, the forces of oil pressures in the cylinder chamber 52 and 53 acting on the spool member 54 keep their balance when the oil pressure in the lower cylinder chamber 53 is a specified value Pl which is smaller than the oil pressure Pu in the upper cylinder chamber 52 (Pu > Pl). Therefore, when the oil pressure supplied into the lower cylinder chamber 53 from the line 104 is controlled by the first and second solenoid valves 151 and 152 so as to be higher than the above pressure Pl, the spool member 54 is moved upward to have a small swash plate angle of the hydraulic motor M, i.e., to have a small speed reduction ratio, while when the oil pressure supplied into the lower cylinder chamber 53 from the line 104 is controlled so as to be smaller than the above pressure Pl, the spool member 52 is moved downward to have a large swash plate angle of the hydraulic motor M, i.e., to have a large speed reduction ratio. Further, a speed reduction ratio detecting sensor (not shown), which is a potentiometer to detect the swash plate angle, is mounted on the trunnion 73a of the swash plate 73.

The two solenoid valves 151 and 152 are controlled by signals from the controller 100: only by controlling the operations of the two solenoid valves 151 and 152 based on the signals from the controller 100, the actuations of the first and second ratio control servo units 30 and 50 are controlled, which results in the control of the displacement of the hydraulic motor M, in other words the control of the speed reduction ratio.

Figure 3:
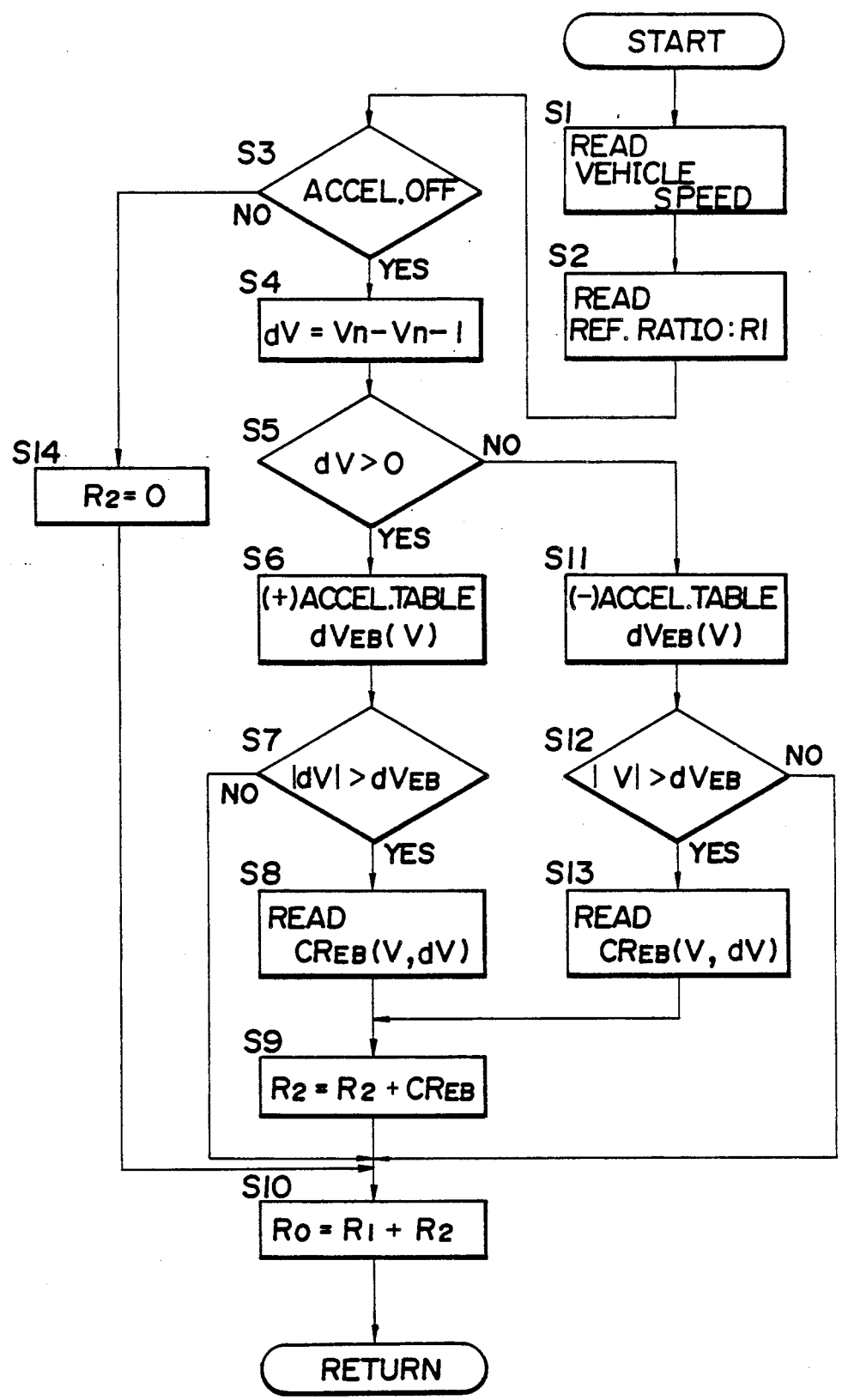
FIG. 3 is a flow chart showing an algorithm of the ratio control according to the method of the present invention.

Now using the flow chart in FIG. 3 is described a method of controlling the speed reduction ratio by the controller 100 in a vehicle equipped with a continuously variable transmission according to the present invention, when the vehicle is decelerated with an engine brake.

This control starts first with detecting a current vehicle speed (STEP S1). Then a reference speed reduction ratio $R_1$ for the vehicle speed is determined based on a predefined speed reduction ratio table for various vehicle speeds (STEP 2). In this table are predefined, for various vehicle speeds, such speed reduction ratios as to obtain engine brake forces normally required in deceleration, for example, on flat roads.

Next, it is judged whether the accelerator pedal is released, or whether the accelerator pedal opening is essentially zero (STEP 3). If the accelerator pedal is still depressed, since it can be judged that engine brake is not utilized a correction $R_2$ for the speed reduction ratio is reset to zero in STEP S14. Then, this control flow goes to STEP S10.

However, if it is judged in STEP S3 that the accelerator pedal has been released, or the vehicle is decelerated with the engine brake, the control goes to STEP S4. An actual vehicle speed change ratio dV is calculated based on the difference between the previously detected vehicle speed $V_{n-1}$ and the currently detected vehicle speed $V_n$. Then it is judged whether the actual vehicle speed change rate dV is positive or negative. If positive, the control goes to STEP S6, and if negative, goes to STEP S11.

First, if the actual vehicle speed change rate dV is positive, the control proceeds to STEP S6. Then, using a table for positive allowable vehicle speed change rates predefined for various vehicle speeds, an allowable vehicle speed change rate $dV_{EB}(V)$ is read from the current vehicle speed. In this table are predefined the limits of the vehicle speed change rates as allowable vehicle speed change rates $dV_{EB}(V)$. This table is necessary when the vehicle speed is increased or the actual vehicle speed change rate dV is positive with the engine brake utilized during running on descending road and so on.

And in STEP S7 it is judged whether the actual vehicle speed change rate dV is greater than the allowable vehicle speed change rate $dV_{EB}(V)$, or whether the actual vehicle speed change rate dV is within the allowable limit. If the actual vehicle speed change rate dV is greater than the allowable vehicle speed change rate $dV_{EB}(V)$, or the actual vehicle speed change rate is out of the allowable limit, the control proceeds to STEP S8. In STEP S8 is determined a correction $CR_{EB}$ of the speed reduction ratio corresponding to the vehicle speed V and the actual vehicle ratio change rate dV using a table of correction for the speed reduction ratio predefined corresponding to vehicle speeds and vehicle speed change rates. In this table of corrections for the speed reduction ratio, are predefined corrections of the speed reduction ratio required for keeping the actual vehicle speed change rate dV within the allowable limit corresponding to the vehicle speed and the vehicle speed change rate. This table is used in the case where the actual vehicle speed change rate dV is out of the allowable limit. This correction makes the speed reduction ratio greater and the engine brake force stronger.

Then, in STEP S9 the correction $CR_{EB}$ of the speed reduction ratio is added to the stored correction $R_2$ of the speed reduction ratio, and the correction corrected by the addition is replaced with the old correction and stored as a new correction $R_2$ of the speed reduction ratio before going to STEP S10.

Further, if the actual vehicle speed change rate dV is smaller than the allowable vehicle speed change rate $dV_{EB}(V)$, or the actual vehicle speed change rate dV is within the allowable limit, the addition of the correction $CR_{EB}$ is not made, retaining the prestored correction $R_2$ of the speed reduction ratio as it is, before proceeding to STEP 10.

On the other hand, if the actual vehicle speed change rate dV is negative, the control proceeds to STEP S11. Using a table for negative allowable vehicle speed change rates predefined for various vehicle speeds, an allowable vehicle speed change rate $dV_{EB}(V)$ is read for the current vehicle speed. In this table are predefined the limits of the vehicle speed change rates as allowable vehicle speed change rates $dV_{EB}(V)$. This table is necessary when the vehicle speed is decreased or the actual vehicle speed change rate dV is negative with the engine brake utilized on the contrary to the above STEP S6.

And, in STEP S12 it is judged whether the absolute value of the actual vehicle speed change rate dV is greater than the allowable vehicle speed change rate $dV_{EB}(V)$, or whether the actual vehicle speed change rate dV is within the allowable limit. If the absolute value of the actual vehicle speed change rate dV is greater than the allowable vehicle speed change rate $dV_{EB}(V)$, or the actual vehicle speed change rate is out of the allowable limit, the control proceeds to STEP S13, in STEP S13, a correction $CR_{EB}$ of the speed reduction ratio corresponding to the vehicle speed V and the actual vehicle speed change rate dV is determined using a table of correction for the speed reduction ratio predefined corresponding to vehicle speeds and vehicle speed change rates. In this table of corrections for the speed reduction ratio, are predefined corrections of the speed reduction ratio required for keeping the actual vehicle speed change rate dV within the allowable limit corresponding to the vehicle speed and the vehicle speed change rate. This table is used in the case where the actual vehicle speed change rate dV is out of the allowable limit. This correction makes the speed reduction ratio smaller and the engine brake force weaker.

Then, in STEP S9 the correction $CR_{EB}$ of the speed reduction ratio is added to the prestored correction $R_2$ of the speed reduction ratio, and the correction corrected by the addition is replaced with the old correction and stored as a new correction $R_2$ of the speed reduction ratio before going to STEP S10.

Further, in STEP S12 if the magnitude of the actual vehicle speed change rate dV is smaller than the allowable vehicle speed change rate $dV_{EB}(V)$, or the actual vehicle speed change rate dV is within the allowable limit, the addition of the correction $CR_{EB}$ is not made, retaining the prestored correction $R_2$ of the speed reduction ratio as it is before proceeding to STEP 10.

Finally, in STEP S10, the reference speed reduction ratio $R_1$ read in STEP S2 and the correction $R_2$ of the speed reduction ratio calculated as described above are summed up to obtain a control value $R_O$. Then the speed reduction ratio control is conducted by the operation of the solenoid valves 151, 152 so that the speed reduction ratio of a continuously variable transmission coincides with the control value $R_O$.

Such a control as mentioned above enable different applications of the engine brake based on road conditions during deceleration of the vehicle. Therefore, even if vehicle speed change rates (in deceleration or in acceleration) are different due to road conditions, the vehicle speed change rate can be maintained within the allowable limit.

The above embodiments exemplify the case where a continuously variable transmission comprising a hydraulic pump and a hydraulic motor is used. But the control method according to the present invention is not limited to such a type of continuously variable transmission, but may be used for other types of continuously variable transmissions. And further, for a control device of the speed reduction ratio, not only such an electro-hydraulic device as shown in the embodiments which control solenoid valves by an electrical controller to actuate servo valves, but also a control device such as to control the speed reduction ratio directly by electric motors may be used.

As described above, in deceleration with the engine brake, a speed control according to the present invention comprises detecting vehicle speed when the vehicle is decelerated by utilizing the engine brake with the accelerator opening being essentially zero, determining the basic speed reduction ratio corresponding to the detected vehicle speed, detecting the actual change rage of the vehicle speed, comparing the actual change rate with the allowable vehicle speed change rate corresponding to the vehicle speed, determining the corrected speed reduction ratio by correcting the reference speed reduction ratio based on a difference between the actual vehicle speed change rate and the allowable vehicle speed change rate, controlling the speed reduction ratio of the continuously variable speed transmission so as to coincide with the corrected speed reduction ratio. Therefore, in the case of great deceleration (great change rate of the vehicle speed toward deceleration) as seen in deceleration on an ascending road, a mode of speed control is selected so as to apply a weak engine brake with a small speed reduction ratio. On the contrary, in the case of small deceleration or acceleration as seen in deceleration on a descending road, another mode of speed control is selected so as to apply a strong engine brake with a large speed reduction ratio. Therefore, the control can provide a variety of engine brake applications desirable for various road conditions, thus improving travel feeling in deceleration with engine brake.

What is claimed is:

1. A method of controlling speed reduction ratio in a continuously variable speed transmission comprising the steps of:
    detecting a vehicle speed when a vehicle is decelerated by utilizing an engine brake with an accelerator opening being substantially zero;
    determining a reference speed reduction ratio corresponding to the detected vehicle speed;
    detecting an actual vehicle speed change rate;
    determining an allowable vehicle speed change rate corresponding to said detected vehicle speed;
    comparing said actual vehicle speed change rate with said allowable vehicle speed change rate;
    determining a corrected speed reduction ratio by correcting said reference speed reduction ratio based on a difference between said actual speed change rate and said allowable speed change rate;
    controlling said speed reduction ratio of said continuously variable speed transmission so as to coincide with said corrected speed reduction ratio.

2. A method of controlling speed reduction ratio in a continuously variable speed transmission as defined in claim 1; wherein said corrected speed reduction ratio is determined by correcting said reference speed reduction ratio toward increasing, when said actual vehicle speed change rate is positive, while said corrected speed reduction ratio is determined by correcting said reference speed reduction ratio toward decreasing, when said actual vehicle speed change rate is negative.

3. A method of controlling speed reduction ratio in a continuously variable speed transmission as defined in claim 1 or 2; wherein said corrected speed reduction ratio is determined by adding a correction to said reference speed reduction ratio.

4. A method of controlling speed reduction ratio in a continuously variable speed transmission as defined in claim 3; wherein said correction is kept constant when said actual vehicle speed change rate is within an allowable limit, said allowable limit being determined based on said allowable vehicle speed change rate, while said correction is modified in correspondence with said detected vehicle speed and said actual vehicle speed change rate when said actual vehicle speed change rate is larger than said allowable limit.

5. A method of controlling speed reduction ratio in a continuously variable speed transmission as defined in claim 1; wherein said transmission is a hydraulic continuously variable speed transmission comprising a hydraulic pump driven by an engine, a hydraulic motor driven by hydraulic force from the hydraulic pump, and a hydraulic closed circuit hydraulically connecting the hydraulic pump and motor, at least one of said hydraulic pump and motor being of variable displacement type;
    and said speed reduction ratio is controlled by varying the displacement of said variable displacement type pump or motor.

* * * * *